United States Patent Office 3,224,252
Patented Dec. 21, 1965

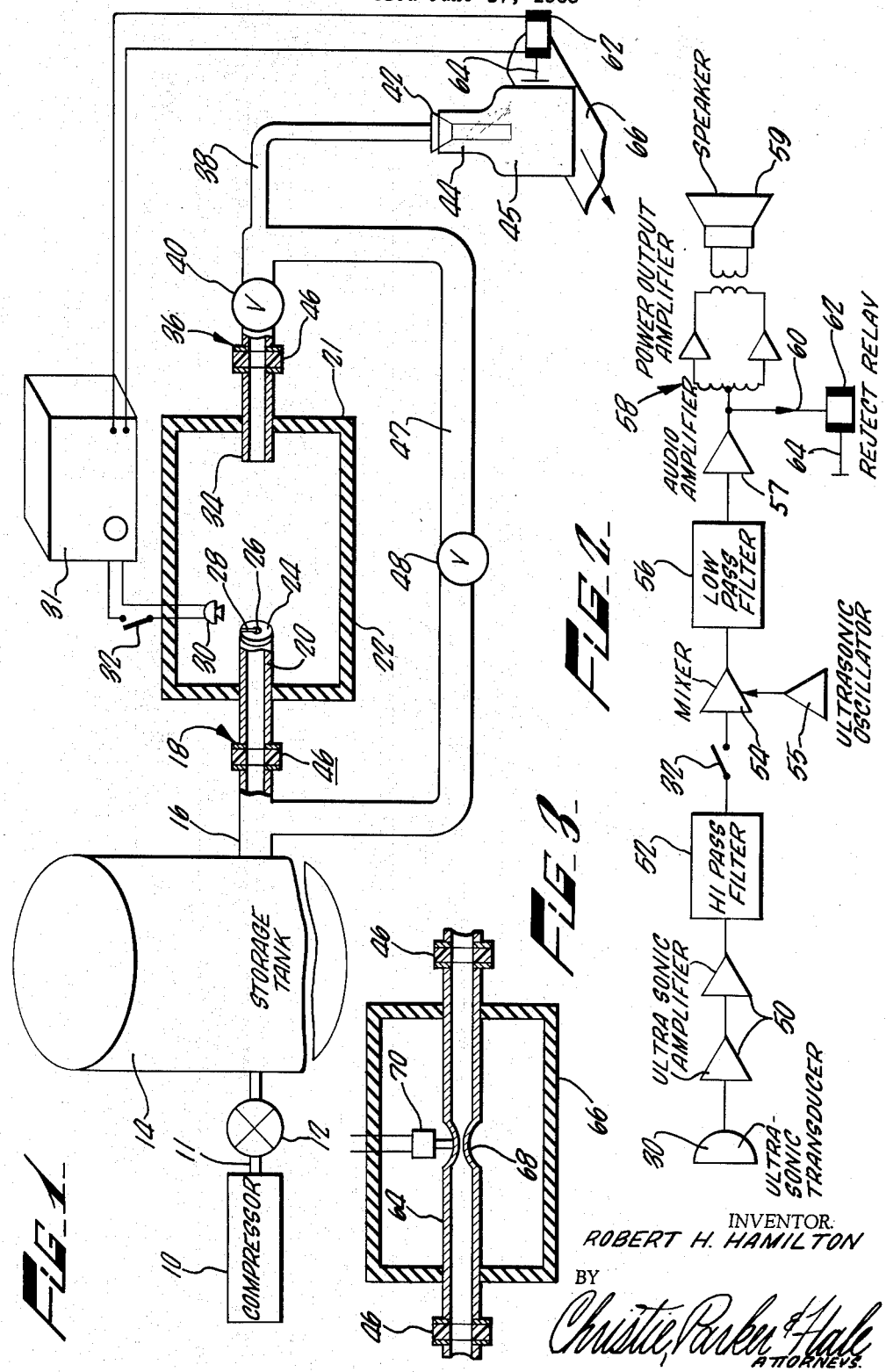

3,224,252
LEAK TESTING
Robert H. Hamilton, Menlo Park, Calif., assignor, by mesne assignments, to Hewlett-Packard Company, Palo Alto, Calif., a corporation of California
Filed June 17, 1963, Ser. No. 288,402
12 Claims. (Cl. 73—49.2)

This invention relates to testing containers for leaks.

In various industries it is important to test different types of containers quickly and reliably for leaks. Examples of such containers are oil drums, radiators, plastic bottles, cans, enclosures for electronic parts, and the like.

In typical prior art leak-testing techniques, a container is subjected to fluid pressure, and then after a lapse of a significant period of time, the container pressure is checked to see whether or not it has fallen below a tolerable value. This technique is objectionable because of the time delay required in making tests.

This invention provides a virtually instantaneous technique for detecting leaks in containers, and therefore is of particular advantage on production lines because it does not significantly slow the flow of product.

Briefly, the apparatus of this invention includes a source of test fluid under pressure. A conduit connects the source to the container under test so that mechanical vibrations are produced due to fluid flowing into the container if its leaks. A transducer is disposed to receive the mechanical vibrations produced by a leaky container and convert them into an electrical signal. Prefereably, the electrical signal generated by the transducer is used to reject defective containers automatically.

Preferably, the conduit connecting the source of test fluid to the container includes an orifice to develop turbulence as fluid flows through it toward a leaky container, and the tranducer is disposed adjacent the orifice for maximum sensitivity. Preferably, the orifice and transducer are surrounded by a sound-proof chamber to reduce the effect of background noise. For maximum sensitivity, a reed or other vibratable element is disposed over the orifice to produce mechanical vibrations of maximum amplitude due to fluid flowing toward a leaky container.

The preferred embodiment of the invention also includes means for bypassing fluid around the chamber and orifice so that a container can be pressurized quickly without all of the required fluid having to flow through the orifice. The test fluid is also preferably stored in a reservoir which is many times larger than the container under test to insure a substantially steady pressure on the container during the test.

The fluid can be of any suitable material, but conveniently, it is gas or air, although liquids may be used.

These and other aspects of the invention will be more fully understood from the following detailed description and the accompanying drawing in which:

FIG. 1 is a schematic drawing of the presently preferred apparatus for testing containers;

FIG. 2 is a block diagram of a circuit used in detecting mechanical vibrations; and FIG. 3 is a sectional elevation of an alternate orifice arrangement for developing vibration when a container leaks.

Referring to FIG. 1, a compressor 10 supplies air through a line 11 and pressure regulator 12 to a storage tank 14. A first flow line 16 connects the storage tank through a flanged coupling 18 to an inlet pipe 20 in a sound-proof box or chamber 21. The sound-proof box is of double wall construction and lined with sound proofing material 22. An orifice plate 24 is disposed over the inner end of the inlet pipe 20, and includes an orifice opening 26. A reed 28 is secured to the orifice plate to extend over the opening 26 and vibrate as gas passes through it. The opening may be any necessary size, depending on the containers tested and the lower limit of the leaks to be detected. Ordinarily an orifice opening of about .001 to about .020" meets most industrial requirements. A microphone 30 is mounted adjacent the orifice plate to pick up the mechanical vibrations developed by the gas flowing through the orifice. The microphone is connected to a detector 31 through a switch 32 so that the mechanical vibrations picked up by the transducer 30 are converted into an electrical signal by a circuit within the detector which is described in detail below with respect to FIG. 2.

Gas flows out of the sound-proof box through an outlet pipe 34 which is connected at its outer end by a flange connection 36 to a second flow line 38 which is connected through a control valve 40 to a socket 42 adapted to fit into the neck 44 of a container 45 under test. Thus, the first flow line 16, inlet pipe 20, the sound-proof box, the outlet pipe 34, and the second flow line 38 form a conduit connecting the source of gas under pressure to the container under test.

The flange connections 18 and 36 each include insulating washers 46 to isolate the inlet and outlet pipes in the sound-proof box from externally induced vibrations.

A bypass line 47 is connected at its opposite ends to the first and second flow lines to form a bypass around the control valve 40 and the orifice in the sound-proof box. A bypass valve 48 controls the flow of gas through the bypass line.

The gas flowing through the orifice vibrates the reed 28 at a frequency primarily in the ultrasonic range, i.e., above about 20,000 c.p.s. Therefore, the microphone 30 is preferably an ultrasonic transducer which is connected, as shown in FIG. 2, through a pair of ultrasonic amplifiers 50 to a high pass filter 52 that rejects substantially all of the signal in the frequency range below about 15,000 c.p.s. The high frequency portion of the signal going through the high pass filter is fed through switch 32 into a mixer 54, which also receives the output of an ultrasonic beat frequency oscillator 55. Preferably, the oscillator output differs from the incoming frequency from the high pass filter by about 3,000 to 5,000 c.p.s. The resulting family of frequencies from the mixer is fed through a low pass filter 56 which removes all frequencies with the exception of those below about 5,000 c.p.s. In other words, only the lower side band of the mixed signal goes through the low pass filter, and the output of the filter is therefore the difference between the frequency of the oscillator and the frequency received from the high pass filter. The low frequency signal from the low pass filter goes through an audio amplifier 57 and a power output amplifier stage 58 to drive a conventional loud speaker 59. Thus, an audible signal is produced in response to ultrasonic vibrations picked up by the ultrasonic transducer at the orifice in the sound-proof box.

The ultrasonic transducer can be the conventional type, and preferably is primarily responsive to vibrations between about 20,000 c.p.s. to about 50,000 c.p.s. A transducer which has a peak response in the range of about 40,000 c.p.s. is particularly effective in detecting leaks.

The output of the audio amplifier is also connected through a lead 60 to a reject relay 62 which has a plunger 64 that automatically ejects defective containers from a conveyor belt 66 when the signal from the audio amplifier stage exceeds a predetermined amount.

Although the preferred embodiment of the invention includes detecting ultrasonic vibrations in testing containers for leaks, vibrations in the sonic range can also be used.

To test a container, the control valve and bypass valve are both closed, and the socket 42 is inserted in the neck of a container. The bypass valve and the control valve are then opened so that the container is quickly filled with air at the same pressure prevailing in the storage tank. Thereafter, the bypass valve is closed, and the control valve is kept open. If the container leaks, even a small flow of gas through the orifice causes vibrations which are picked up by the transducer and converted into an electrical signal which develops an audible sound at the speaker and actuates the relay to eject the container. Preferably, the end of the second flow line adjacent the container is flexible so that when the defective container is struck by the reject relay plunger, the container is knocked off the conveyor and loose from the socket 42. Of course, the bypass line can be omitted and the container be filled only by gas flowing through the orifice. However, this increases testing time.

If the container does not leak, valve 40 is closed, the socket is removed, and the container moved by the conveyor belt past the testing station.

For automatic operation, the socket 42 is forced into the container by an air-actuated plunger (not shown) which holds the socket in place with the force necessary to prevent leaking around the socket while the container is under test.

The advantage of the apparatus of this invention is that the container is tested immediately after being pressurized to the same pressure as the storage tank, and it is not necessary to wait for the pressure within the container to fall below some predetermined value. Moreover, the orifice localizes the noise due to a leak any place in the container, and there is no need to search around the container with a probe looking for a leak. In addition, the sound-proof chamber isolates the orifice and transducer from unwanted background noises which might otherwise interfere with the test.

If desired, the automatic reject relay can be eliminated and the audible output from the speaker 59 be used to indicate a defective container. In such a case, the defective container is rejected manually. If desired, the speaker can be eliminated and reliance place solely on the reject relay. However, it is usually desired to use both warning devices.

Preferably, the storage tank is at least 5 to 50 times the volume of the container under test to maintain a substantially steady pressure even when a leaky container is encountered. The pressure maintained in the tank depends on the type of containers tested, and can vary from a few inches of water to hundreds of pounds per square inch above atmospheric.

Referring to FIG. 3, a continuous conduit 64 extends through a sound-proof box 66. One end of the conduit is connected to a source (not shown) of fluid under pressure, and the other end of the conduit is adapted to be connected to a container (not shown) to be checked for leaks. The central portion of conduit 64 within the sound-proof box is of abruptly reduced diameter at 68 to form a restriction which produces vibration when fluid such as air flows through the restriction. A microphone 70 is mounted in direct mechanical contact with the conduit at the reduced section to provide maximum sensitivity in detecting small leaks. The microphone is connected to a detector (not shown) such as that described with respect to FIG. 1.

The apparatus shown in FIG. 3 is substantially identical with that described in FIGS. 1 and 2, except that the conduit is continuous through the sound-proof box, and the microphone is in direct mechanical contact with the conduit at the point of restriction to provide maximum sensitivity in detecting small leaks.

Although in the illustrated examples the container is tested by applying fluid pressure to its interior, the reverse procedure can be used. For example, a completely enclosed container, such as a housing for a transistor, can be placed in a test vessel which is sealed, except for being connected to the sound-proof box. Thereafter, the test vessel is pressurized to a value equal to the source. If gas leaks into the housing within the vessel, it is detected by the vibrations produced at the orifice in the sound-proof box.

I claim:

1. Apparatus for leak-testing a container, the apparatus including a source of test fluid under pressure, a conduit connecting the source to the container, an orifice plate disposed in the conduit for partially restricting flow through the conduit to develop mechanical vibrations due to fluid flowing into the container if it leaks, and a transducer disposed to receive mechanical vibrations produced by a leaky container and convert them into an electrical signal.

2. Apparatus for leak-testing a container, the apparatus including a source of test fluid under pressure, a conduit connecting the source to the container, an orifice plate disposed in the conduit for partially restricting flow through the conduit to develop mechanical vibrations due to fluid flowing into the container if it leaks, a transducer disposed to receive mechanical vibrations produced by a leaky container and convert them into an electrical signal, and means responsive to the signal for automatically rejecting a leaky container.

3. Apparatus for leak-testing a container, the apparatus including a source of test fluid under pressure, a conduit connecting the source to the container, an orifice plate disposed in the conduit for partially restricting flow through the conduit to develop mechanical vibrations due to fluid flowing into the container if it leaks, and a transducer disposed adjacent the orifice plate to receive mechanical vibrations produced by a leaky container and convert them into an electrical signal.

4. Apparatus for leak-testing a container, the apparatus including a source of test fluid under pressure, a conduit connecting the source to the container, an orifice dipsosed in the conduit, and a vibratable element mounted over the orifice in the path of fluid flowing through it to develop mechanical vibrations due to fluid flowing into the container if it leaks, and a transducer disposed adjacent the orifice to receive mechanical vibrations produced by a leaky container and convert them into an electrical signal.

5. Apparatus for leak-testing a container, the apparatus including a source of test fluid under pressure, a conduit connecting the source to the container, an orifice plate disposed in the conduit for partially restricting flow through the conduit to develop mechanical vibrations due to fluid flowing into the container if it leaks, a transducer disposed adjacent the orifice plate to receive mechanical vibrations produced by a leaky container and convert them into an electrical signal, and a sound-proof chamber disposed around the orifice plate.

6. Apparatus for leak-testing a container, the apparatus including a source of test fluid under pressure, a conduit connecting the source to the container, an orifice disposed in the conduit to develop mechanical vibrations due to fluid flowing into the container if it leaks, a bypass line connected to the conduit around the orifice, and a transducer disposed adjacent the orifice to receive mechanical vibration produced by a leaky container and convert them into an electrical signal.

7. Apparatus for leak-testing a container, the apparatus including a source of test fluid under pressure, a conduit connecting the source to the container, an orifice disposed in the conduit to develop mechanical vibrations due to fluid flowing into the container if it leaks, a bypass line connected to the conduit around the orifice, a valve in the bypass line, and a transducer disposed adjacent the orifice to receive mechanical vibrations produced by a leaky container and convert them into an electrical signal.

8. Apparatus for leak-testing a container, the apparatus including a source of test fluid under pressure, a conduit connecting the source to the container, a control valve in the conduit, an orifice plate disposed in the conduit for partially restricting flow through the conduit to develop mechanical vibrations due to fluid flowing into the container if it leaks, and a transducer disposed adjacent the orifice plate to receive mechanical vibrations produced by a leaky container and convert them into an electrical signal.

9. Apparatus for leak-testing a container, the apparatus including a storage tank of test fluid under pressure, the volume of the storage tank being at least several times greater than that of the container, a conduit connecting the source to the container, an orifice plate disposed in the conduit for partially restricting flow through the conduit to develop mechanical vibrations due to fluid flowing into the container if it leaks, and a transducer disposed to receive mechanical vibrations produced by a leaky container and convert them into an electrical signal.

10. Apparatus for leak-testing a container, the apparatus including a storage tank of test fluid under pressure, the volume of the storage tank being at least several times greater than that of the container, means for keeping the pressure of the fluid in the storage tank substantially constant, a conduit conecting the source to the container, an orifice plate disposed in the conduit for partially restricting flow through the conduit to deveop mechanical vibrations due to fluid flowing into the container if it leaks, and a transducer disposed to receive mechanical vibrations produced by a leaky container and convert them into an electrical signal.

11. Apparatus for leak-testing a container, the apparatus comprising a source of test fluid under pressure, a conduit connecting the source to the container, means forming a restriction in the conduit to produce vibration as fluid flows into the container if it leaks, and a transducer in direct mechanical contact with the conduit adjacent the restriction to receive the vibration produced by a leaky container and convert it into an electrical signal.

12. Apparatus for leak-testing a container, the apparatus comprising a source of test fluid under pressure, a conduit connecting the source to the container, means forming a restriction in the conduit to produce vibration as fluid flows into the container if it leaks, a transducer in direct mechanical contact with the conduit adjacent the restriction to receive the vibration produced by a leaky container and convert it into an electrical signal, and a sound-proof chamber disposed around the transducer and the portion of the conduit with the restriction.

References Cited by the Examiner
UNITED STATES PATENTS

| | | | |
|---|---|---|---|
| 1,762,449 | 6/1930 | Marks | 181—33.4 |
| 1,935,445 | 11/1933 | Heinz | 73—194 |
| 2,008,934 | 7/1935 | Smith | 73—40.5 |
| 2,807,012 | 9/1957 | Schwarz | 340—239 |
| 2,936,611 | 5/1960 | Le Mat et al. | 73—40 |
| 3,028,450 | 4/1962 | Manning | 73—40.5 |
| 3,091,958 | 6/1963 | Robins | 73—45.2 |

LOUIS R. PRINCE, *Primary Examiner.*

ISAAC LISANN, *Examiner.*